United States Patent
Satou

(10) Patent No.: US 9,902,031 B2
(45) Date of Patent: Feb. 27, 2018

(54) SPINDLE PHASE INDEXING DEVICE FOR MACHINE TOOL

(71) Applicant: FANUC CORPORATION, Yamanashi (JP)

(72) Inventor: Yoshikazu Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/429,438

(22) Filed: Feb. 10, 2017

(65) Prior Publication Data

US 2017/0239766 A1 Aug. 24, 2017

(30) Foreign Application Priority Data

Feb. 19, 2016 (JP) .................. 2016-030217

(51) Int. Cl.
*B23Q 17/22* (2006.01)
*B23Q 5/20* (2006.01)
(Continued)

(52) U.S. Cl.
CPC .............. *B23Q 1/766* (2013.01); *B23P 23/02* (2013.01); *B23Q 5/20* (2013.01); *B23Q 15/26* (2013.01); *B23Q 16/001* (2013.01); *B23Q 16/021* (2013.01); *B23Q 1/621* (2013.01); *B23Q 11/00* (2013.01); *B23Q 2220/006* (2013.01); *Y10T 29/50* (2015.01); *Y10T 29/5107* (2015.01); *Y10T 29/5115* (2015.01)

(58) Field of Classification Search
CPC .... B23Q 15/26; B23Q 5/20; B23Q 2230/002; Y10T 29/50; Y10T 29/5115
USPC .................... 29/560, 30; 384/7–59
See application file for complete search history.

(56) References Cited

U.S. PATENT DOCUMENTS 3,619,013 A * 11/1971 Jones ..................... B23Q 1/38
384/12
4,403,179 A * 9/1983 Kohzai .................. B23Q 15/26
318/632
(Continued)

FOREIGN PATENT DOCUMENTS

DE 3404497 A1 * 8/1985
EP 2505285 A1 * 10/2012
(Continued)

OTHER PUBLICATIONS

English Abstract and Machine Translation for Japanese Publication No. 10-328979 A, published Dec. 15, 1998, 6 pgs.
(Continued)

*Primary Examiner* — Erica E Cadugan
(74) *Attorney, Agent, or Firm* — Fredrikson & Byron, P.A.

(57) ABSTRACT

A spindle phase indexing device for a machine tool is equipped with a guide rail detachably or fixedly attached to a table, a phase indexing jig configured to travel on the guide rail and which includes a first fitting part, a cutting tool including a second fitting part configured to be fitted with the first fitting part, and a controller configured to store therein a phase of a spindle at a point in time when the first fitting part and the second fitting part are fitted together. The first fitting part and the second fitting part are formed such that rotation of the cutting tool is constrained when the first fitting part and the second fitting part are fitted together.

14 Claims, 10 Drawing Sheets

(51) Int. Cl.
*B23Q 16/00* (2006.01)
*B23Q 1/76* (2006.01)
*B23Q 15/26* (2006.01)
*B23P 23/02* (2006.01)
*B23Q 16/02* (2006.01)
B23Q 1/62 (2006.01)
B23Q 11/00 (2006.01)

(56) References Cited

U.S. PATENT DOCUMENTS

| | | | |
|---|---|---|---|
| 4,596,502 A * | 6/1986 | Cattani | B23B 29/04 408/234 |
| 6,073,323 A * | 6/2000 | Matsumoto | B23B 3/161 29/27 C |
| 9,364,899 B2 * | 6/2016 | Satou | B23B 29/12 |
| 2015/0080197 A1 * | 3/2015 | Yang | B23B 3/065 483/1 |

FOREIGN PATENT DOCUMENTS

| | | | |
|---|---|---|---|
| JP | 10328979 A | | 12/1998 |
| JP | 4652873 B2 | | 12/2010 |
| JP | 2011-041985 A | * | 3/2011 |

OTHER PUBLICATIONS

English Abstract (JP 2006-289513 A) and Machine Translation for Japanese Publication No. 4652873 B2, published Dec. 24, 2010, 6 pgs.

\* cited by examiner

SPINDLE PHASE INDEXING DEVICE FOR MACHINE TOOL

CROSS-REFERENCE TO RELATED APPLICATION

This application is based upon and claims the benefit of priority from Japanese Patent Application No. 2016-030217 filed on Feb. 19, 2016, the contents of which are incorporated herein by reference.

BACKGROUND OF THE INVENTION

Field of the Invention

The present invention relates to a spindle phase indexing device for a machine tool.

Description of the Related Art

In various types of cutting machining used by machine tools, there is a machining process called a hale machining, in which a feed axis is operated while a spindle is kept in a fixed state (non-rotated state), and a cutting tool attached to a distal end of the spindle performs cutting work on a workpiece. In the hale machining, drag machining is carried out while the spindle remains fixed, and thus the phase in the direction of rotation of a tool holder and the cutting tool that are attached to the spindle distal end is vitally important.

It is known that if the machining rake angle is changed, the machined surface quality also changes greatly. If the phase in a direction of rotation of the spindle of the machine tool is changed when a haling tool is mounted thereon, as a result, it leads to a change in the rake angle of the haling tool. Thus, determining (indexing) of the phase of the spindle of the machine tool becomes an important factor for obtaining good products by hale machining.

As disclosed in Japanese Laid-Open Patent Publication No. 10-328979, a device for indexing a spindle phase using a touch sensor has been proposed in which a tip end of a haling tool is brought into contact with the touch sensor, and the position of a tool rake face is grasped to thereby determine the spindle phase. Further, as disclosed in Japanese Patent No. 4652873, a device for indexing a spindle phase using a non-contact sensor has been proposed.

SUMMARY OF THE INVENTION

As disclosed in Japanese Laid-Open Patent Publication No. 10-328979, there is a danger in that direct contact of a tip end of the tool may lead to damaging of the tool. In particular, in the case that the material to be cut is a non-carbon based material such as aluminum or the like, although a single crystal diamond frequently is used as the tool material, compared to other materials, the single crystal diamond having a sharp cutting edge is easily damaged. Therefore, the technology of Japanese Laid-Open Patent Publication No. 10-328979 cannot be used.

In the case of such a device for indexing a spindle phase using a non-contact sensor as in Japanese Patent No. 4652873, the non-contact sensors tend to be expensive, which places a heavy burden on cost.

The present invention has been devised with a view toward the aforementioned problems, and has the object of providing a spindle phase indexing device for a machine tool, in which the cutting edge of a cutting tool is not directly contacted, and which is inexpensive in terms of cost.

In order to achieve the aforementioned object, a spindle phase indexing device for a machine tool is characterized by including a guide rail which is detachably or fixedly attached to a table, a phase indexing jig configured to travel on the guide rail, the phase indexing jig including a concave or convex first fitting part, a cutting tool attached to a spindle of the machine tool, the cutting tool including a second fitting part configured to be fitted with the first fitting part is provided, and a controller configured to store therein a phase of the spindle at a point in time when the first fitting part and the second fitting part are fitted together, wherein the first fitting part and the second fitting part are formed so as to constrain rotation of the cutting tool when the first fitting part and the second fitting part are fitted together.

According to the spindle phase indexing device for a machine tool in which the above configuration is adopted, when the cutting tool is moved relatively with respect to the phase indexing jig, and the first fitting part and the second fitting part are fitted together, the spindle on which the cutting tool is mounted receives a force from the phase indexing jig and is rotated thereby. Owing thereto, the cutting tool is constrained in a predetermined orientation with respect to the phase indexing jig, and at that point in time, the controller stores the phase of the spindle. Consequently, by using this device, at low cost and without damaging the cutting edge of the distal end of the cutting tool, the phase of the spindle of the machine tool on which the cutting tool is mounted can easily be determined and indexed.

In the above-described spindle phase indexing device for a machine tool, the guide rail may be detachably attached to an upper surface of the table.

In accordance with this configuration, the guide rail can easily be installed.

In the above-described spindle phase indexing device for a machine tool, the second fitting part may be of a concave shape or a convex shape by which two surfaces or more thereof are constrained when fitted with the first fitting part.

In accordance with this configuration, the first fitting part and the second fitting part are fitted together, whereby the cutting tool can accurately be constrained, and the phase of the spindle can reliably be indexed.

In the above-described spindle phase indexing device for a machine tool, one of the first fitting part and the second fitting part may include a groove, and a first flat portion adjacent to the groove, and another of the first fitting part and the second fitting part may include a convex part that conforms to the groove, and a second flat portion adjacent to the convex part.

In accordance with this configuration, at the time of fitting, the groove and the convex part are placed in contact with each other, and the first flat portion and the second flat portion are placed in contact with each other, whereby the cutting tool can accurately be constrained, and the phase of the spindle can reliably be indexed.

In the above-described spindle phase indexing device for a machine tool, the groove and the convex part may be formed in arcuate shapes.

In accordance with this configuration, the first fitting part and the second fitting part can smoothly be fitted together.

In the above-described spindle phase indexing device for a machine tool, the machine tool may include a first feed axis configured to be operated in a direction perpendicular to a rotation center of the spindle, and a second feed axis configured to be operated in a direction perpendicular to the rotation center and the first feed axis. In addition, in a state in which the guide rail is attached to the table, the phase indexing jig may be configured to be operated in parallel with a feeding operation direction of the first feed axis or the second feed axis.

In accordance with this configuration, by operating a feed axis of the first feed axis and the second feed axis that is operated in a direction perpendicular to the movable direction of the phase indexing jig, the cutting tool can easily be pressed against the phase indexing jig such that the first fitting part and the second fitting part are fitted together.

In the above-described spindle phase indexing device for a machine tool, the controller may store a coordinate value when the first fitting part and the second fitting part are fitted together, concerning one feed axis of the first feed axis and the second feed axis that is operated in a direction perpendicular to a movable direction of the phase indexing jig.

In accordance with this configuration, when the first fitting part and the second fitting part are fitted together, application of a large load on the spindle and the cutting tool can be prevented.

According to the present invention, a spindle phase indexing device for a machine tool can be provided in which the cutting edge of the cutting tool is not directly contacted, and which is inexpensive in terms of cost.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a spindle phase indexing device for a machine tool according to the present invention will be described below with reference to the accompanying drawings.

Figure 1:
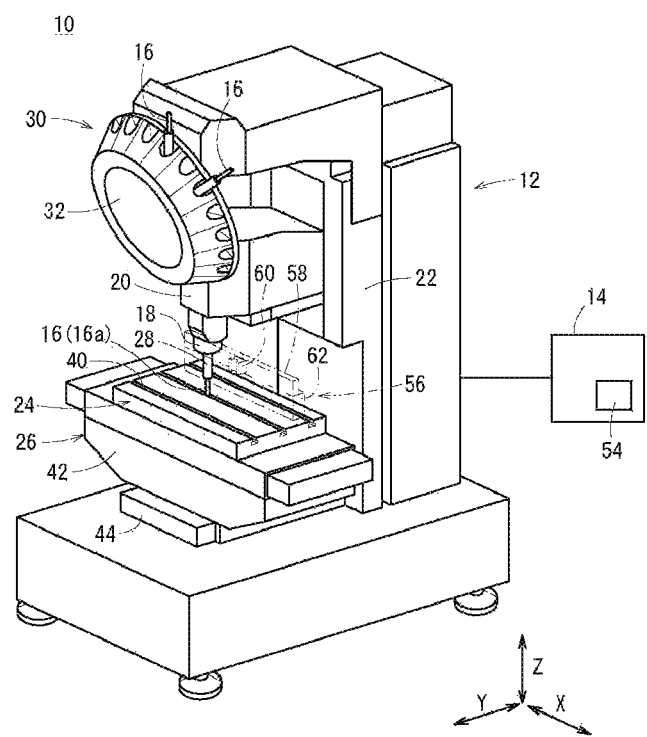
FIG. 1 is a perspective view of a machining system equipped with a spindle phase indexing device for a machine tool according to an embodiment of the present invention.

As shown in FIG. 1, a machining system 10 is equipped with a machine tool 12 that carries out machining on a workpiece W (see FIG. 2) by a cutting tool 16 mounted on a spindle 18, and a controller 14 that controls the machine tool 12.

The machine tool 12 comprises the spindle 18 on which the cutting tool 16 is mounted, a spindle head 20 for rotatably driving the spindle 18, a column 22 that moves the spindle head 20 in a vertical direction (Z direction), a table 24 for fixing the workpiece W thereon, and a table drive device 26 that moves the table 24 in two horizontal directions (X direction and Y direction) perpendicular to Z direction.

The cutting tool 16 is retained in a tool holder 28, and is mounted detachably to the spindle 18 through the tool holder 28 that can be attached to and detached from the spindle 18. According to the present embodiment, the machine tool 12 is constituted as a machining center in which the cutting tool 16 that is attached to the spindle 18 is capable of being exchanged by an automatic tool exchanging device 30. The automatic tool exchanging device 30 includes a tool magazine 32 capable of accommodating (retaining) a plurality of cutting tools 16, which each are held in the tool holder 28.

The plural cutting tools 16 include at least a haling tool. The haling tool is a tool (fixed tool) that performs cutting without rotating, and more specifically, is a cutting tool that carries out hale machining of a type in which the front of a cutting edge thereof is oriented at all times in a cutting direction. Below, the cutting tool 16 in the form of a haling tool will be referred to as a "cutting tool 16a". As will be discussed later, the cutting tool 16a is a constituent element of a spindle phase indexing device 56, and includes a second fitting part 76 (see FIG. 4). Details concerning the second fitting part 76 will be discussed later.

Additionally, the plural cutting tools 16 include, as other tools, for example, a drill, an end mill, a haling tool, and a trimmer, etc. The plural cutting tools 16 may contain a plurality of haling tools of differing sizes, shapes, etc. The configuration of the machine tool 12 is not limited to a machining center. The machine tool 12 may be constituted as a machine tool that is dedicated solely to hale machining.

The spindle 18 is supported in the spindle head 20 so as to be capable of rotating about an axis of rotation of the spindle parallel to the Z direction. The aforementioned cutting tool 16 is mounted on the spindle 18 by inserting the tool holder 28 that holds the cutting tool 16, into an installation hole provided on the distal end of the spindle 18. In a state where the cutting tool 16 is mounted on the spindle 18, relative rotation between the spindle 18 and the cutting tool 16 about the axis of rotation is prevented.

Figure 2:
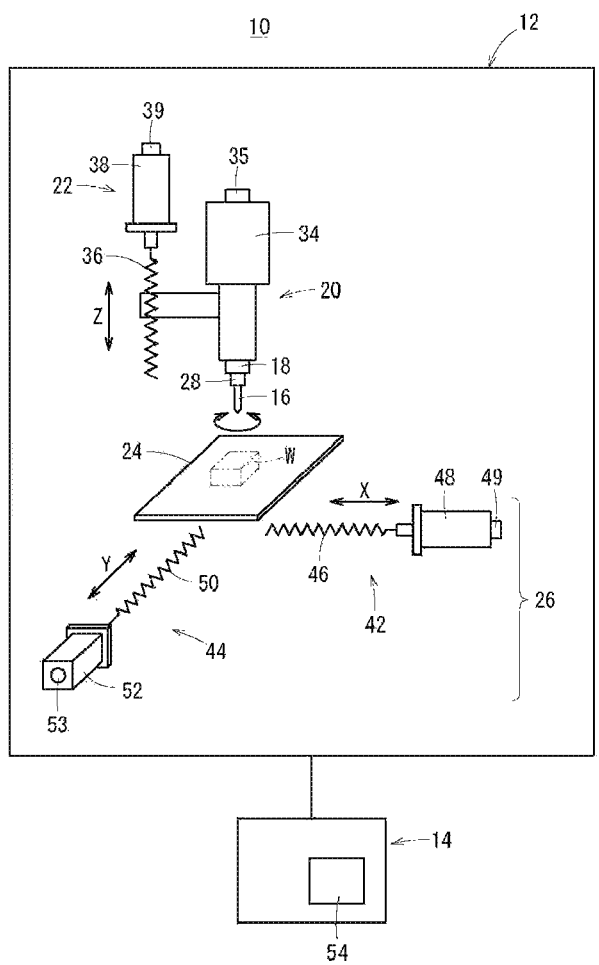
FIG. 2 is a schematic outline view of the machining system shown in FIG. 1.

As shown in FIG. 2, the spindle head 20 includes a spindle motor 34 that rotatably drives the spindle 18. The spindle motor 34 is used as a spindle motor that rotates continuously at a high speed, when a cutting operation is performed in which a rotating tool such as an end mill or the like is attached to the spindle 18, and on the other hand, when a cutting operation is performed in which a fixed tool such as the haling tool is attached to the spindle 18, the spindle motor 34 is used for controlling the phase (rotational position) of the spindle 18.

A position detector 35 (rotary encoder) that detects the rotational position (phase) of the spindle motor 34 is provided on the spindle motor 34. The position detector 35 also includes a function as a speed detector for detecting a rotation speed.

The column 22 includes a Z-axis feed mechanism 36 as a lifting mechanism that raises and lowers the spindle head 20 along the Z direction, and a Z-axis motor 38 that drives the Z-axis feed mechanism 36. A position detector 39 that detects a rotational position of the Z-axis motor 38 is provided on the Z-axis motor 38.

As shown in FIG. 1, the table 24 is arranged downwardly of the spindle 18. On an upper surface 24a of the table 24, a plurality of straight lock grooves 40 are formed at given intervals. The workpiece W is fixed to the table 24 through a non-illustrated workpiece fixing jig. The workpiece fixing jig is constituted so as to be capable of being fixed to the upper surface 24a of the table 24 using the lock grooves 40.

The table 24 is supported by the table drive device 26. The table drive device 26 includes a first slide member 42 that causes the table 24 to move in the X direction, and a second slide member 44 that causes the table 24 to move in the Y direction perpendicular to the X direction. The table 24 is supported by the first slide member 42 so as to be slidable in the X direction.

As shown in FIG. 2, the first slide member 42 includes an X-axis feed mechanism 46 that moves the table 24 in the X direction, and an X-axis motor 48 that drives the X-axis feed mechanism 46, and is supported by the second slide member 44 so as to be slidable in the Y direction. A position detector 49 that detects a rotational position of the X-axis motor 48 is provided on the X-axis motor 48.

The second slide member 44 includes a Y-axis feed mechanism 50 that moves the first slide member 42 in the Y direction, and a Y-axis motor 52 that drives the Y-axis feed mechanism 50. A position detector 53 that detects a rotational position of the Y-axis motor 52 is provided on the Y-axis motor 52.

By the table drive device 26 which is constituted in the foregoing manner, the table 24 is capable of being moved in two mutually perpendicular directions on a horizontal plane.

With the machine tool 12 of the present embodiment, by the X-axis feed mechanism 46, a feed axis (first feed axis) is constituted that realizes relative movement in the X direction between the spindle 18 and the table 24. Below, this feed axis will be referred to as an "X direction feed axis". Further, by the Y-axis feed mechanism 50, a feed axis (second feed axis) is constituted that realizes relative movement in the Y direction between the spindle 18 and the table 24. Below, this feed axis will be referred to as a "Y direction feed axis". Further, by the Z-axis feed mechanism 36, a feed axis is constituted that realizes relative movement in the Z direction between the spindle 18 and the table 24. Below, this feed axis will be referred to as a "Z direction feed axis".

In this manner, in the case of the present embodiment, the machine tool 12 is constituted as a so-called 3-axis machine tool, including three feed axes in three mutually perpendicular directions (XYZ directions). The machine tool 12 may include four or more feed axes.

In the machine tool 12, the Z direction feed axis may be disposed on the table drive device 26, not on the spindle head 20, and the table 24 may be moved in three orthogonal directions by the table drive device 26. Stated otherwise, the table drive device 26 may constitute three feed axes movable in three orthogonal directions. Alternatively, the X direction feed axis and the Y direction feed axis may be disposed on the spindle head 20, not on the table drive device 26, and the spindle 18 may be moved in three orthogonal directions by the spindle head 20. Stated otherwise, the spindle head 20 may constitute three feed axes movable in three orthogonal directions.

The controller 14 is a numerical controller that numerically controls the machine tool 12 so as to carry out a desired machining process with respect to the workpiece W according to a machining program. The controller 14 includes a processor for carrying out overall control of operations of the controller 14 itself, a ROM in which a system program is stored, and a RAM (hereinafter referred to as a "storage unit 54") where various types of information can be written and read, etc. In the storage unit 54, there is stored a machining program, etc. which is read in or input through an interface or the like. The machining program descriptively defines commands with respect to a computer, so as to perform a desired cutting process with respect to the workpiece W.

In accordance with the machining program, the controller 14 controls driving of the spindle motor 34 and the respective feed axis motors 38, 48, 52. In this case, while receiving a feedback signal from the position detector 35 provided on the spindle motor 34, the controller 14 numerically controls the spindle motor 34. Further, while receiving feedback signals from the position detectors 39, 49, 53 provided respectively on the feed axis motors 38, 48, 52, the controller 14 numerically controls each of the motors 38, 48, 52. By such a controller 14, while the phase of the spindle 18 of the machine tool 12 and the position of the table 24 are controlled precisely, machining is carried out on the workpiece W by the cutting tool 16 that is attached to the spindle 18.

As shown in FIG. 1, the spindle phase indexing device 56 for the machine tool 12 according to the present embodiment is equipped with a guide rail 58 which is detachably attached to the table 24, and a phase indexing jig 60 that is capable of traveling on the guide rail 58. The spindle phase indexing device 56 further comprises the aforementioned cutting tool 16a and the controller 14.

Figure 3:
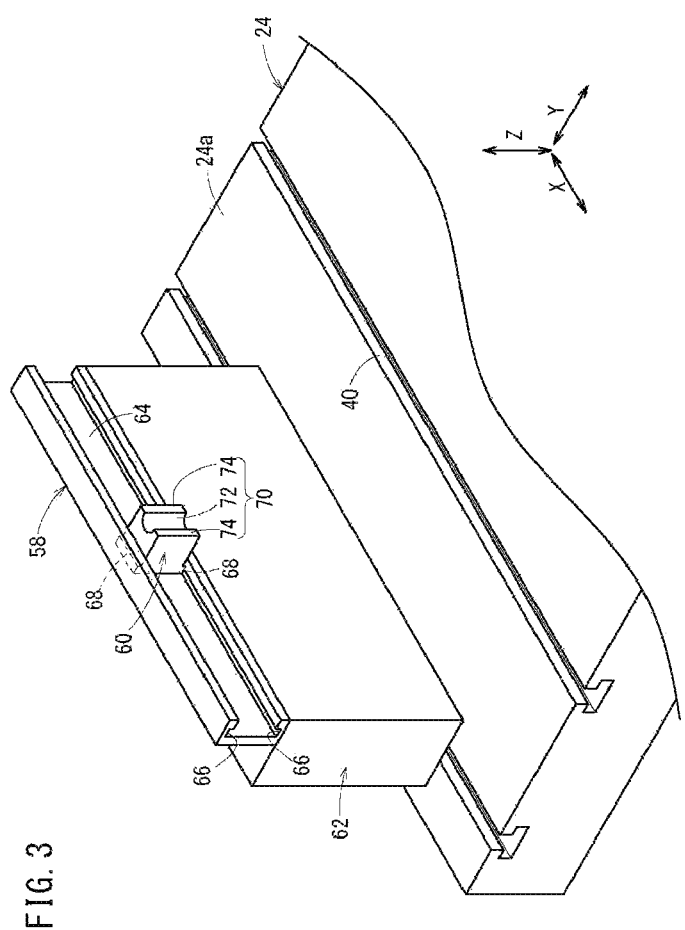
FIG. 3 is a perspective view of a guide rail mounted on a table, and a phase indexing jig.

As shown in FIG. 3, in the present embodiment, the guide rail 58 is detachably attached to the upper surface 24a of the table 24 through a fixing jig 62. The guide rail 58 includes a rail groove 64 that extends in a straight line. On both upper and lower ends of the rail groove 64, guide grooves 66 are formed along the direction in which the rail groove 64 extends. The phase indexing jig 60 is capable of sliding along the direction of extension of the rail groove 64.

On both upper and lower ends of a base portion side of the phase indexing jig 60 that is inserted into the rail groove 64, guide projections 68 are provided, which are capable of being inserted into the guide grooves 66 and are capable of sliding along the guide grooves 66. In accordance with this feature, while the phase indexing jig 60 is prevented from separating from the rail groove 64 in a vertical direction, the phase indexing jig 60 can be moved smoothly in the direction of extension of the rail groove 64.

When the phase indexing jig 60 and the cutting tool 16a are fitted together, as will be discussed later, in order that a cutting edge 17 on the distal end of the cutting tool 16a avoids coming into contact with the upper surface 24a of the table 24, the guide rail 58 is constituted so as to retain the phase indexing jig 60 at a height position that is higher than the upper surface 24a of the table 24 by a predetermined height.

More specifically, as shown in FIG. 3, the fixing jig 62 is fixed to the upper surface 24a of the table 24, and the guide rail 58 is fixed to the fixing jig 62. The fixing jig 62 includes an engagement part capable of engaging with the lock grooves 40 disposed on the table 24, and the fixing jig 62 is fixed firmly to the table 24 by the engagement part engaging with the lock grooves 40. The guide rail 58 is retained at a height position that is higher than the upper surface 24a of the table 24 by the height of the fixing jig 62. Instead of the fixing jig 62, the thickness of a lower part of the guide rail 58 itself may be made larger in size, and the lower part may be fixed directly to the table 24.

The guide rail 58 is capable of being attached and fixed in parallel with the direction in which the X direction feed axis is operated, or in parallel with the direction in which the Y direction feed axis is operated. In FIG. 3, the guide rail 58 is mounted on the table 24 in parallel with the direction in which the X direction feed axis is operated. Therefore, the phase indexing jig 60 is capable of sliding in parallel with the operating direction of the X direction feed axis. Moreover, in the case that the guide rail 58 is mounted in parallel with the direction in which the Y direction feed axis is operated, the phase indexing jig 60 is capable of sliding in parallel with the operating direction of the Y direction feed axis.

A first fitting part 70 is provided on the phase indexing jig 60. According to the present embodiment, the first fitting part 70 includes a groove 72, and two first flat portions 74 adjacent to both sides of the groove 72. In FIG. 3, the two first flat portions 74 reside in the same plane. The two first flat portions 74 may reside in different planes that are in parallel with each other or inclined to each other.

In the mounted state shown in FIG. 3 (i.e., a state in which the guide rail 58 that retains the phase indexing jig 60 is attached to the table 24), the groove 72 and the first flat portions 74 extend in parallel with the Z direction. The groove 72 is formed in an arcuate shape (a semicircular shape in the illustrated example). The groove 72 may be an arcuate groove that is less than or does not satisfy the definition of a semicircle.

Figure 4:
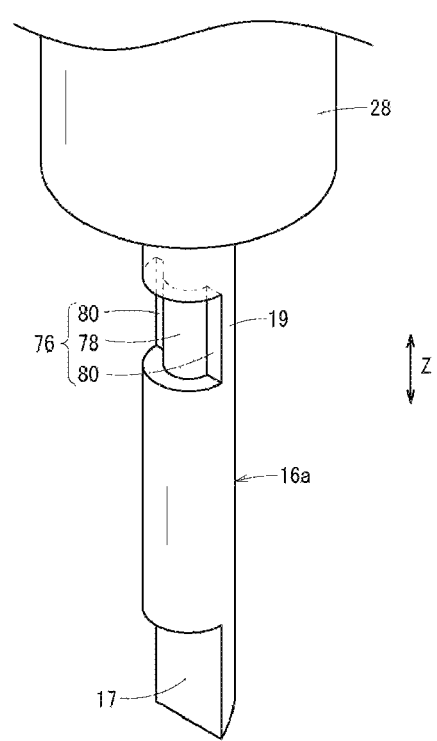
FIG. 4 is a perspective view of a cutting tool and a tool holder.

As shown in FIG. 4, a second fitting part 76, which is capable of being fitted with the aforementioned first fitting part 70, is provided on the cutting tool 16a. The second fitting part 76 is formed on a shank 19 of the cutting tool 16a (i.e., a body portion on the proximal end side of the cutting tool 16a). The second fitting part 76 is formed such that, in a state of being fitted with the first fitting part 70, rotation thereof about a central axis of the cutting tool 16a with respect to the phase indexing jig 60 is limited (prevented).

Although in FIG. 4, the second fitting part 76 is formed at the same circumferential position as the cutting edge 17 of the cutting tool 16a, the second fitting part 76 may be formed at a different circumferential position from the cutting edge 17. The positional relationship in the circumferential direction between the second fitting part 76 and the cutting edge 17 on the cutting tool 16a is stored in the storage unit 54 (see FIG. 1) of the controller 14.

According to the present embodiment, the second fitting part 76 includes a convex part 78 having a shape to conform (match) with the groove 72 of the first fitting part 70, and two second flat portions 80 adjacent to both sides of the convex part 78. In FIG. 4, the two second flat portions 80 reside in the same plane. In the case that the aforementioned two first flat portions 74 reside in different planes that are in parallel with each other or inclined to each other, the two second flat portions 80 may also reside in different planes that are in parallel with each other or inclined to each other.

The convex part 78 and the second flat portions 80 extend in parallel with the lengthwise direction of the cutting tool 16a, i.e., the Z direction. The convex part 78 is formed with the same arcuate shape as the groove 72 (a semicircular shape in the illustrated example). The convex part 78 may be an arcuate projection that is less than or does not satisfy the definition of a semicircle.

In the present embodiment, the second fitting part 76 is formed in a recessed shape with respect to the outer circumferential surface of the shank 19. The second fitting part 76 may also be formed in a raised shape with respect to the outer circumferential surface of the shank 19.

The length of the above-described guide rail 58 may be set so as to allow displacement of the phase indexing jig 60 when the first fitting part 70 and the second fitting part 76 are fitted together (displacement in a direction perpendicular to the direction in which the first fitting part 70 and the second fitting part 76 are fitted together). The guide rail 58 may have a length that is somewhat elongated as shown in FIG. 3, or may have a length that is about the same as the movable range in which the feed axis (the X direction feed axis in the present embodiment) is operated in parallel with the direction in which the guide rail 58 is installed. However, it is not necessary for the guide rail 58 to have a length in excess of the movable range of the feed axis.

Next, operations and effects of the spindle phase indexing device 56, which is constructed in the manner described above, will be explained.

In FIG. 1, a cutting tool 16a in the form of a haling tool is mounted on the spindle 18 of the machine tool 12. Prior to carrying out machining with respect to a workpiece W by the cutting tool 16a, the phase of the spindle 18 is determined (indexed) in the following manner by the spindle phase indexing device 56.

First, as shown in FIG. 3, the guide rail 58 is mounted on the table 24 in parallel with the direction of movement of one of the two feed axes that are arranged perpendicular to the Z direction (the X direction feed axis in the present embodiment). According to the present embodiment, the guide rail 58 is mounted on and fixed to the upper surface 24a of the table 24 through the fixing jig 62. Further, the phase indexing jig 60 is attached to the guide rail 58. Accordingly, if a force is applied to the phase indexing jig 60, the phase indexing jig 60 can move in parallel to the feed axis (the X direction feed axis in the present embodiment) that is arranged in the direction in which the guide rail 58 is mounted. The guide rail 58 with the phase indexing jig 60 already attached thereto may also be mounted on the table 24.

Figure 5:
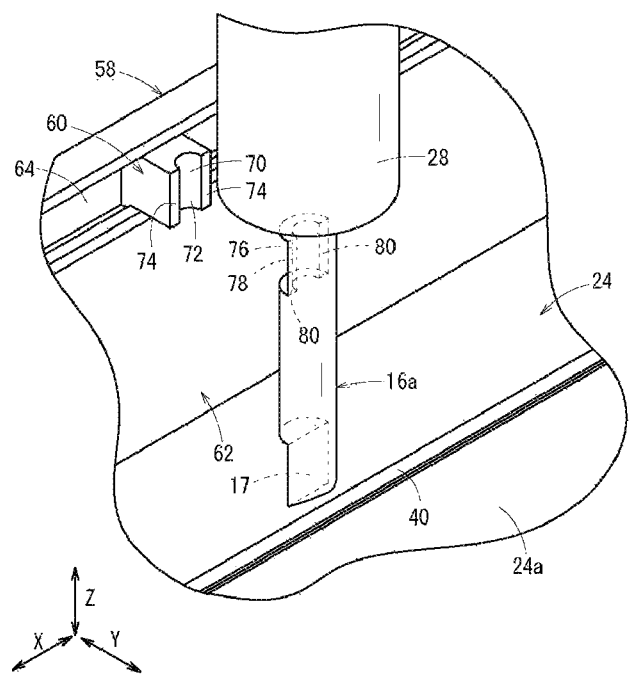
FIG. 5 is a perspective view showing a condition in which a first fitting part of the phase indexing jig and a second fitting part of the cutting tool are disposed so as to face each other.

Next, an operator operates the machine tool 12 by way of a non-illustrated operation panel such that, as shown in FIG. 5, the relative positioning between the cutting tool 16a and the phase indexing jig 60 is adjusted so as to position the cutting tool 16a in front of the phase indexing jig 60. Further, the operator operates the machine tool 12 by the operation panel, whereby the cutting tool 16a is rotated so that the first fitting part 70 of the phase indexing jig 60 and the second fitting part 76 of the cutting tool 16a generally face toward one another.

Figure 6:
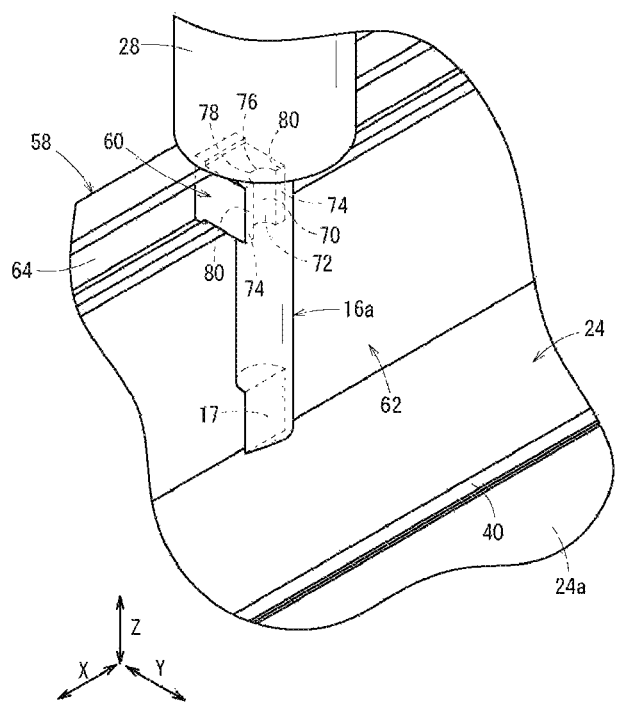
FIG. 6 is a perspective view showing a state in which the first fitting part and the second fitting part are fitted together.

Next, under a control operation of the controller 14, the machining system 10 controls driving of the feed axis (the Y direction feed axis) that is arranged in a direction perpendicular to the feed axis (the X direction feed axis) arranged in the direction in which the guide rail 58 is mounted, whereby as shown in FIG. 6, the phase indexing jig 60 is pressed against the cutting tool 16a so that the first fitting part 70 and the second fitting part 76 are fitted together. When the first fitting part 70 and the second fitting part 76 are fitted together, the phase indexing jig 60 remains capable of being moved along the guide rail 58. Consequently, an excessive load accompanying such fitting is prevented from being applied to the cutting tool 16a and the spindle 18.

According to the present embodiment, by being supported on the guide rail 58 that is raised by the fixing jig 62, the phase indexing jig 60 is separated moderately from the upper surface 24a of the table 24, so that the distal end (cutting edge 17) of the cutting tool 16a does not contact the upper surface 24a of the table 24 when the first fitting part 70 and the second fitting part 76 are fitted together. Owing to this feature, interference between the upper surface 24a of the table 24 and the cutting edge 17 of the cutting tool 16a can be avoided, and fitting of the first fitting part 70 and the second fitting part 76 can be carried out without obstruction. Further, as discussed above, instead of being raised by the fixing jig 62, by making the thickness of the lower part of the phase indexing jig 60 larger in size, interference between the upper surface 24a of the table 24 and the cutting edge 17 of the cutting tool 16a may be avoided.

Figure 7A:
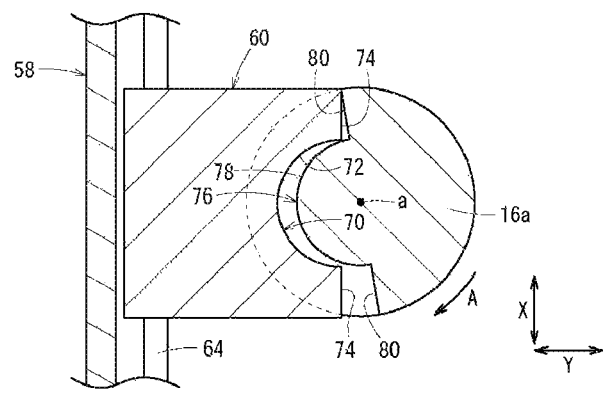
FIG. 7A is a cross-sectional view showing a condition immediately before fitting the first fitting part and the second fitting part together.

At the start of fitting of the first fitting part 70 and the second fitting part 76, as shown in FIG. 7A, if the second fitting part 76 is inclined with respect to the direction of proper fitting with the first fitting part 70, the cutting tool 16a is pressed by the phase indexing jig 60 so as to receive a force in a direction to be rotated. Owing to this feature, the cutting tool 16a is forcibly rotated so that the first fitting part 70 and the second fitting part 76 are fitted together accurately (in other words, the second fitting part 76 follows the shape of the first fitting part 70). More specifically, in the case of the present embodiment, one of the first flat portions 74 of the first fitting part 70 presses one of the second flat portions 80 of the second fitting part 76, whereby the cutting tool 16a is rotated in the direction of the arrow A in FIG. 7A.

Figure 7B:
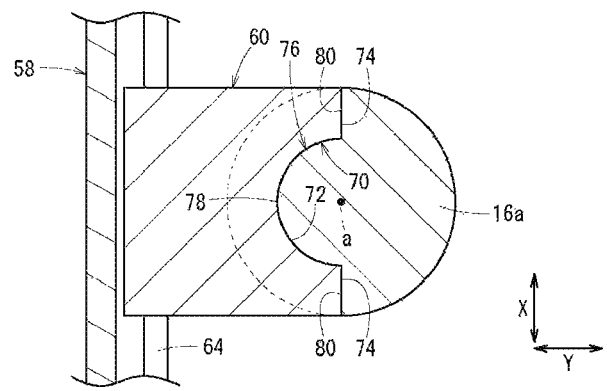
FIG. 7B is a cross-sectional view showing a condition in which the first fitting part and the second fitting part have been fitted together.

By rotation of the cutting tool 16a in the manner described above, as shown in FIG. 7B, due to the groove 72 and the first flat portions 74 of the first fitting part 70, the convex part 78 and the second flat portions 80 of the second fitting part 76 are constrained. More specifically, in a state in which the first fitting part 70 and the second fitting part 76 are fitted together mutually, the groove 72 of the first fitting part 70 and the convex part 78 of the second fitting part 76 contact with (abut against) each other, while the first flat portions 74 of the first fitting part 70 and the second flat portions 80 of the second fitting part 76 contact with (abut against) each other.

Consequently, by fitting of the second fitting part 76 with the first fitting part 70, the second fitting part 76 is placed in a state in which the two differing surfaces thereof are constrained. In this case, the convex part 78 forms one of such surfaces, whereas the two second flat portions 80 form another one of the surfaces. Incidentally, according to the present embodiment, since the two second flat portions 80 reside in the same plane, they are treated together as one surface. In the case that the two second flat portions 80 reside in different planes that are parallel or inclined, three surfaces of the second fitting part 76 are constrained by fitting of the second fitting part 76 with the first fitting part 70.

As a result of fitting together the first fitting part 70 and the second fitting part 76 in this manner, the cutting tool 16a is placed in a non-rotatable condition at a specified phase with respect to the phase indexing jig 60, and the phase of the cutting tool 16a is determined.

Accompanying rotation of the cutting tool 16a, the spindle 18, to which the cutting tool 16a is attached so as not to be relatively rotatable, also is rotated. In a state where the phase of the cutting tool 16a has been determined (i.e., in a state where the first fitting part 70 and the second fitting part 76 are completely fitted together), the controller 14 reads the phase of the spindle 18 from the position detector 35 (see FIG. 2) provided on the spindle motor 34. The controller 14 stores the read phase of the spindle 18 in the storage unit 54 as a spindle reference phase. In this manner, indexing of the phase of the spindle 18 is completed. Once the phase of the spindle 18 has been indexed, the guide rail 58 and the phase indexing jig 60 are removed from the table 24.

Further, at a point in time when the first fitting part 70 and the second fitting part 76 have been fitted together exactly, from among the X direction feed axis and the Y direction feed axis, the controller 14 may stop driving of the feed axis (in the case of the present embodiment, the Y direction feed axis) that is operated in a direction perpendicular to the movable direction in which the phase indexing jig 60 is capable of moving. In accordance with this configuration, when the first fitting part 70 and the second fitting part 76 are fitted together, application of an excessive load on the spindle 18 and the cutting tool 16a can be avoided. In this case, concerning the feed axis from among the X direction feed axis and the Y direction feed axis that is operated in a direction perpendicular to the movable direction of the phase indexing jig 60, a coordinate value at the time when the first fitting part 70 and the second fitting part 76 are fitted together is acquired beforehand, and the coordinate value is stored in the storage unit 54 of the controller 14.

The method for acquiring the coordinate value in this case is not particularly limited, and any known method can be adopted. For example, in place of the cutting tool 16a, a touch probe of a shape that approximates the shape of the cutting tool 16a can be attached to the spindle 18. In addition, the feed axis of the X direction feed axis and the Y direction feed axis that is operated in a direction perpendicular to the movable direction of the phase indexing jig 60 is driven, to thereby bring the touch probe into contact with the phase indexing jig 60, and a coordinate value at the time of contact therebetween is read in. Consequently, the coordinate value can be measured. Alternatively, the coordinate value can be measured by monitoring a load at the time of contact between the cutting tool 16a and the phase indexing jig 60 by way of a current value that flows to the feed axis motor (the X-axis motor 48 or the Y-axis motor 52).

In the forgoing manner, the phase (spindle reference phase) of the spindle 18 can be determined and indexed by the spindle phase indexing device 56. As discussed above, the controller 14 stores in the storage unit 54 the positional relationship in the circumferential direction between the second fitting part 76 and the cutting edge 17 on the cutting tool 16a. Accordingly, the controller 14 determines an association between the phase of the spindle 18 at the point in time that the first fitting part 70 and the second fitting part 76 are fitted together, and the circumferential position of the cutting edge 17 of the cutting tool 16a, and stores the association in the storage unit 54. Thus, when cutting machining is carried out on the workpiece W using the cutting tool 16a, based on the phase (the aforementioned spindle reference phase) of the spindle 18 stored in the storage unit 54, the controller 14 controls the angle (rotational position) of the spindle 18. Consequently, it is possible to perform highly accurate machining (hale machining) with respect to the workpiece W.

In the case that the machining system 10 is equipped with the automatic tool exchanging device 30, and it is possible to exchange a plurality of haling tools, each time that a haling tool is mounted on the spindle 18, the phase of the spindle 18 may be determined using the spindle phase indexing device 56. In this case, the guide rail 58 (including a guide rail 58 having a large thickness at the lower part thereof) may remain attached to the table 24 at all times. Alternatively, the guide rail 58 may be attached and fixed to the table 24 in a non-detachable manner (i.e., fixedly attached to the table 24).

As has been described above, in accordance with the spindle phase indexing device 56 according to the present embodiment, when the cutting tool 16a is moved relatively with respect to the phase indexing jig 60, and the first fitting part 70 and the second fitting part 76 are fitted together, the spindle 18 on which the cutting tool 16a is mounted receives a force from the phase indexing jig 60 and is rotated thereby. Owing thereto, the cutting tool 16a is constrained in a predetermined orientation with respect to the phase indexing jig 60, and at that point in time, the controller 14 stores the phase of the spindle 18. Consequently, by using the spindle phase indexing device 56, at low cost and without damaging the cutting edge 17 of the distal end of the cutting tool 16a, the phase of the spindle 18 of the machine tool 12 on which the cutting tool 16a is mounted can easily be determined and indexed.

According to the present embodiment, since the guide rail 58 can be mounted on the upper surface 24a of the table 24, the guide rail 58 can be installed easily.

Since the second fitting part 76 has a shape (a convex shape in the present embodiment) in which two surfaces or more are constrained when the second fitting part 76 is fitted with the first fitting part 70, the cutting tool 16a can be constrained accurately by fitting together the first fitting part 70 and the second fitting part 76, and the phase of the spindle 18 can be indexed reliably.

According to the present embodiment, the first fitting part 70 includes the groove 72 and the first flat portions 74 adjacent to the groove 72, and the second fitting part 76 includes the convex part 78 that conforms with the groove 72 and the second flat portions 80 adjacent to the convex part 78. In accordance with this configuration, when the first fitting part 70 and the second fitting part 76 are fitted together, the groove 72 and the convex part 78 are placed in contact with each other, and the first flat portions 74 and the second flat portions 80 are placed in contact with each other, whereby the cutting tool 16a can accurately be constrained, and the phase of the spindle 18 can reliably be indexed. In particular, since the groove 72 and the convex part 78 are formed with arcuate shapes, the first fitting part 70 and the second fitting part 76 can be fitted together smoothly.

According to the present embodiment, in a state where the guide rail 58 is mounted on the table 24, the phase indexing jig 60 is capable of being moved in parallel with the feeding operation direction of the X direction feed axis or the Y direction feed axis. In accordance with this feature, by operating one of the X direction feed axis and the Y direction feed axis that is operated in a direction perpendicular to the movable direction of the phase indexing jig 60, the cutting tool 16a can easily be pressed against the phase indexing jig 60 such that the first fitting part 70 and the second fitting part 76 are fitted together.

According to the present embodiment, concerning one feed axis of the X direction feed axis and the Y direction feed axis that is operated in a direction perpendicular to the movable direction of the phase indexing jig 60, the controller 14 stores therein a coordinate value at the time that the first fitting part 70 and the second fitting part 76 are fitted together. In accordance with this feature, when the first fitting part 70 and the second fitting part 76 are fitted together, application of a large load on the cutting tool 16a and the spindle 18 can be prevented.

It is acceptable insofar as the first fitting part 70 and the second fitting part 76 have irregular (concave/convex) shapes by which two surfaces or more are constrained when fitted together. For example, the modifications shown in FIGS. 8 through 10 may be offered.

Figure 8:
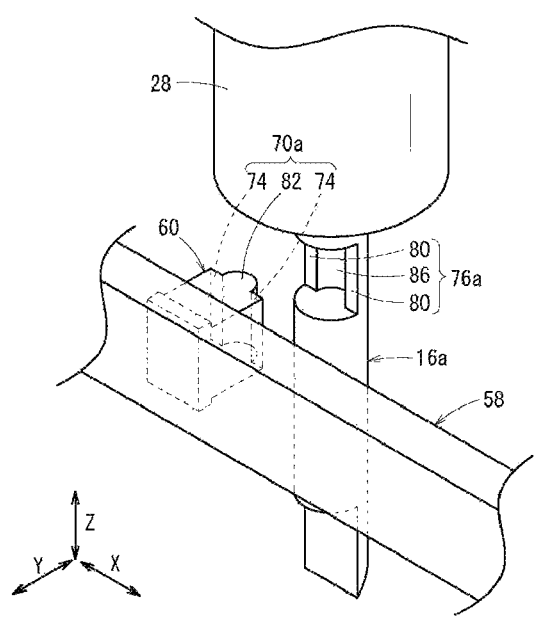
FIG. 8 is a perspective view showing a first modification of the first fitting part and the second fitting part.

Concerning a first fitting part 70a on the phase indexing jig 60 and a second fitting part 76a on the cutting tool 16a shown in FIG. 8, the concave/convex relationship between the above-described first fitting part 70 and second fitting part 76 (FIGS. 3 and 4) is reversed. More specifically, in FIG. 8, the first fitting part 70a includes an arcuate convex part 82, and two first flat portions 74 adjacent to both sides of the convex part 82. The second fitting part 76a includes an arcuate groove 86 that conforms to the convex part 82 of the first fitting part 70a, and two second flat portions 80 adjacent to both sides of the groove 86. By this type of first fitting part 70a and second fitting part 76a as well, two surfaces or more thereof are constrained at the time of fitting, whereby the phase of the cutting tool 16a can accurately be determined.

Figure 9:
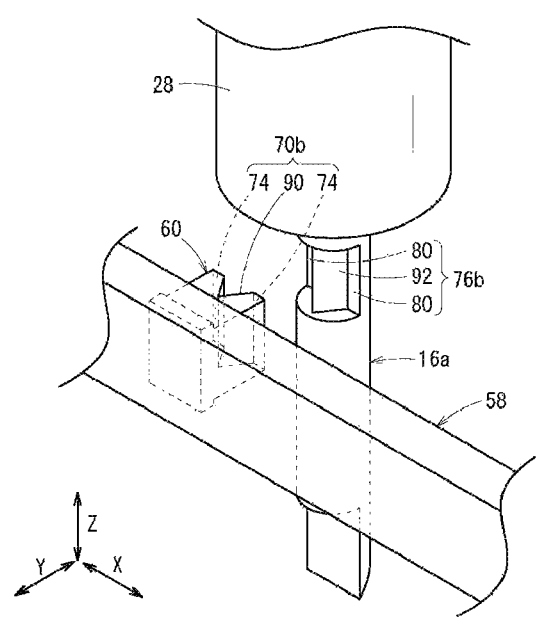
FIG. 9 is a perspective view showing a second modification of the first fitting part and the second fitting part.

A first fitting part 70b of the phase indexing jig 60 shown in FIG. 9 includes a V-shaped groove 90, and two first flat portions 74 adjacent to both sides of the groove 90. A second fitting part 76b of the cutting tool 16a shown in FIG. 9 includes a V-shaped convex part 92 that fits into the groove 90 of the first fitting part 70b, and two second flat portions 80 adjacent to both sides of the convex part 92. By this type of first fitting part 70b and second fitting part 76b as well, two surfaces or more thereof are constrained at the time of fitting, whereby the phase of the cutting tool 16a can accurately be determined. Alternatively, the first fitting part 70b may include the V-shaped convex part 92 instead of the V-shaped groove 90, and the second fitting part 76b may include the V-shaped groove 90 instead of the V-shaped convex part 92.

Figure 10:
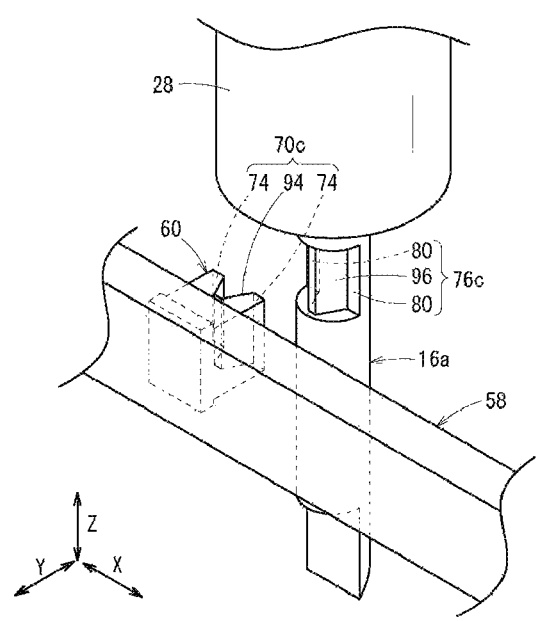
FIG. 10 is a perspective view showing a third modification of the first fitting part and the second fitting part.

A first fitting part 70c of the phase indexing jig 60 shown in FIG. 10 includes a trapezoidal groove 94, and two first flat portions 74 adjacent to both sides of the groove 94. A second fitting part 76c of the cutting tool 16a shown in FIG. 10 includes a trapezoidal convex part 96 that fits into the groove 94 of the first fitting part 70c, and two second flat portions 80 adjacent to both sides of the convex part 96. By this type of first fitting part 70c and second fitting part 76c as well, two surfaces or more thereof are constrained at the time of fitting, whereby the phase of the cutting tool 16a can accurately be determined. Alternatively, the first fitting part 70c may include the trapezoidal convex part 96 instead of the trapezoidal groove 94, and the second fitting part 76c may include the trapezoidal groove 94 instead of the trapezoidal convex part 96.

The present invention is not limited to the embodiment described above, and various modifications can be made to the invention without deviating from the essential scope of the present invention as set forth in the appended claims.

What is claimed is:

1. A spindle phase indexing device for a machine tool comprising:
   a guide rail which is detachably or fixedly attached to a workpiece table of the machine tool;
   a phase indexing jig configured to travel on the guide rail, the phase indexing jig including a concave or convex first fitting part;
   a cutting tool attached to a spindle of the machine tool, the cutting tool including a convex or concave, respectively, second fitting part configured to be fitted with the first fitting part; and
   a controller configured to store therein a phase of the spindle at a point in time when the first fitting part and the second fitting part are fitted together,
   wherein the first fitting part and the second fitting part are formed so as to constrain rotation of the cutting tool when the first fitting part and the second fitting part are fitted together.

2. The spindle phase indexing device for a machine tool according to claim 1, wherein the guide rail is detachably attached to an upper surface of the table.

3. The spindle phase indexing device for a machine tool according to claim 1, wherein two surfaces or more of the second fitting part are in contact with the first fitting part when the second fitting part is fitted with the first fitting part.

4. The spindle phase indexing device for a machine tool according to claim 1, wherein:
   the concave one of the first fitting part and the second fitting part includes a groove, and a first flat portion adjacent to the groove; and
   another of the first fitting part and the second fitting part includes a convex part that conforms to the groove, and a second flat portion adjacent to the convex part.

5. The spindle phase indexing device for a machine tool according to claim 4, wherein the groove and the convex part are formed in arcuate shapes.

6. The spindle phase indexing device for a machine tool according to claim 1, wherein:
   the machine tool includes a first feed mechanism configured to move the workpiece table in a first direction perpendicular to a rotation center axis of the spindle, and a second feed mechanism configured to move the workpiece table in a second direction perpendicular to the rotation center axis and the first feed axis; and
   in a state in which the guide rail is attached to the table, the phase indexing jig is configured to be moved along the guide rail in a direction parallel with one of the first direction or the second feed direction.

7. The spindle phase indexing device for a machine tool according to claim 6, wherein the controller stores a coordinate value when the first fitting part and the second fitting part are fitted together.

8. A spindle phase indexing device for a machine tool comprising:
   a guide rail which is detachably or fixedly attached to an upper surface of a workpiece table of the machine tool;
   a phase indexing jig configured to travel on the guide rail, the phase indexing jig including a concave or convex first fitting part;
   a cutting tool attached to a spindle of the machine tool, the cutting tool including a second fitting part configured to be fitted with the first fitting part; and
   a controller configured to store therein a phase of the spindle at a point in time when the first fitting part and the second fitting part are fitted together,
   wherein the first fitting part and the second fitting part are formed so as to constrain rotation of the cutting tool when the first fitting part and the second fitting part are fitted together.

9. The spindle phase indexing device for a machine tool according to claim 8, wherein the guide rail is detachably attached to the upper surface of the table.

10. The spindle phase indexing device for a machine tool according to claim 8, wherein the first fitting part is one of a concave or convex shape, and wherein the second fitting part is the other of a concave shape or a convex shape, and wherein two surfaces or more of the second fitting part are in contact with the first fitting part when the second fitting part is fitted with the first fitting part.

11. The spindle phase indexing device for a machine tool according to claim 8, wherein:
    one of the first fitting part and the second fitting part includes a groove, and a first flat portion adjacent to the groove; and
    another of the first fitting part and the second fitting part includes a convex part that conforms to the groove, and a second flat portion adjacent to the convex part.

12. The spindle phase indexing device for a machine tool according to claim 11, wherein the groove and the convex part are formed in arcuate shapes.

13. The spindle phase indexing device for a machine tool according to claim 8, wherein:
    the machine tool includes a first feed mechanism configured to move the workpiece table in a first direction perpendicular to a rotation center axis of the spindle, and a second feed mechanism configured to move the workpiece table in a second direction perpendicular to the rotation center axis and the first feed axis; and
    in a state in which the guide rail is attached to the table, the phase indexing jig is configured to be moved along the guide rail in a direction parallel with one of the first direction or the second feed direction.

14. The spindle phase indexing device for a machine tool according to claim 13, wherein the controller stores a coordinate value when the first fitting part and the second fitting part are fitted together.

* * * * *